Figure 5:
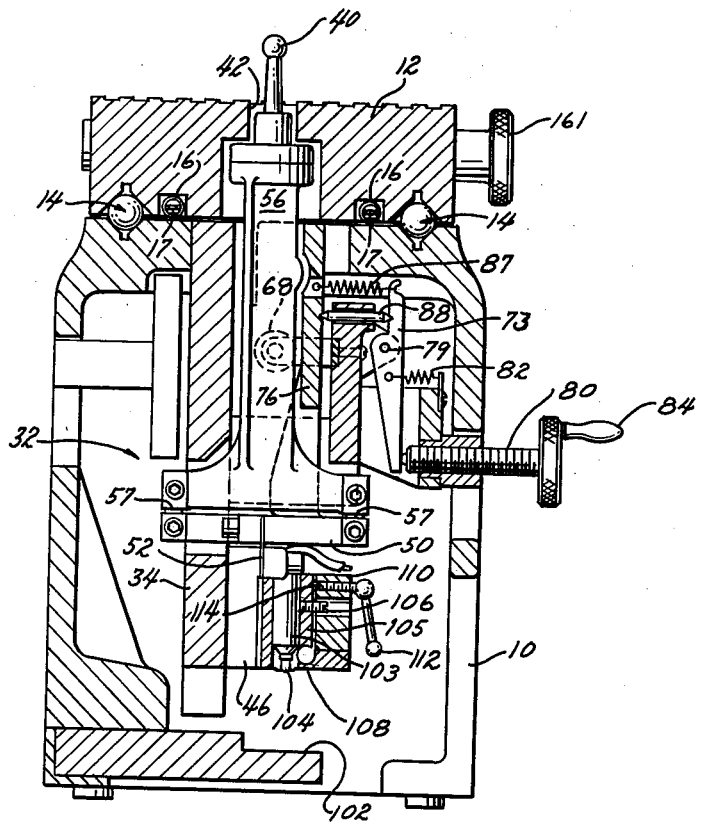

June 25, 1963  R. A. MAHLMEISTER ETAL  3,094,788
GAGING DEVICE
Filed June 9, 1958  4 Sheets-Sheet 1
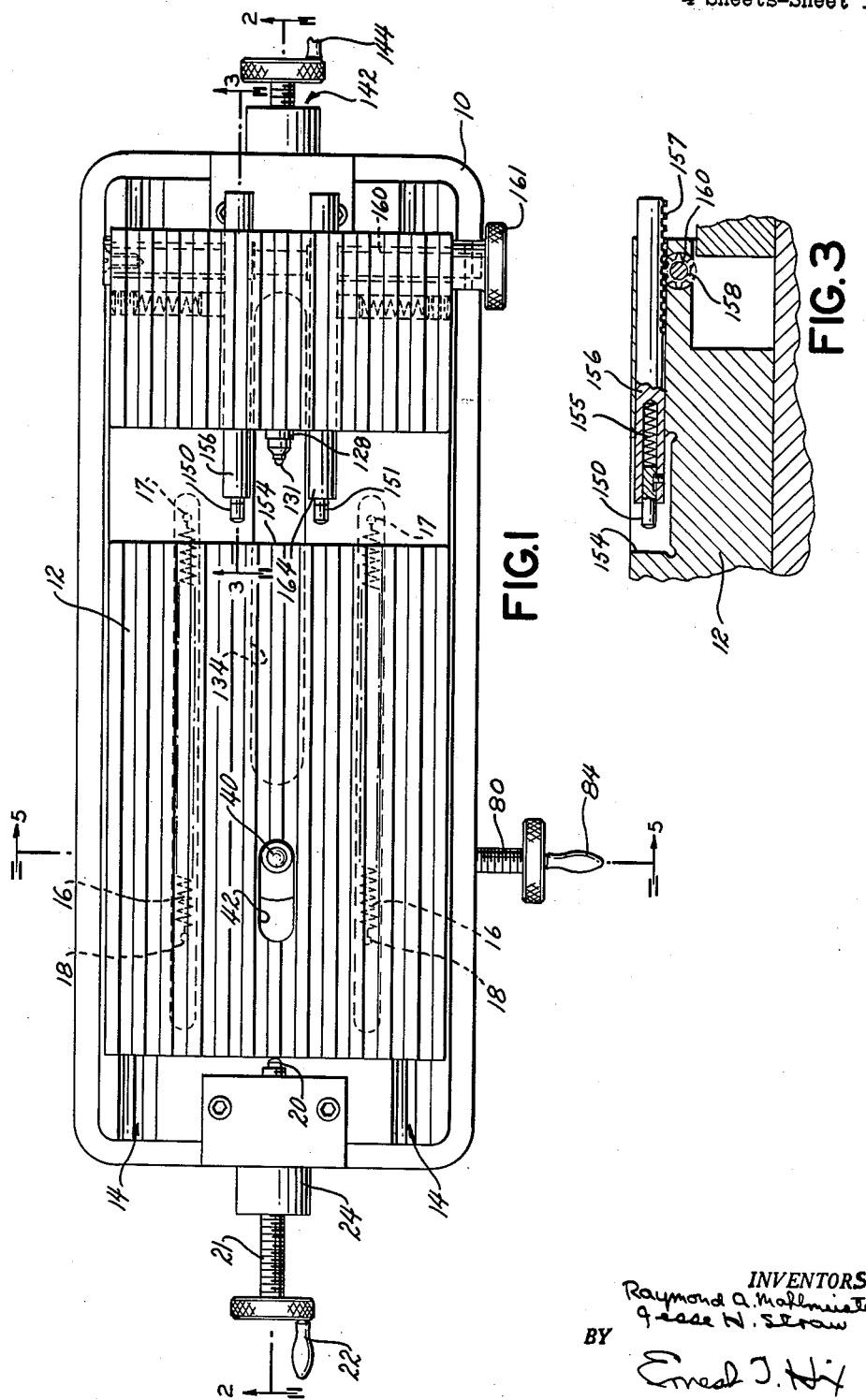
INVENTORS
Raymond A. Mahlmeister
Jesse N. Straw
BY
Erneal J. Hix
ATTORNEY June 25, 1963    R. A. MAHLMEISTER ETAL    3,094,788
GAGING DEVICE
Filed June 9, 1958    4 Sheets-Sheet 2
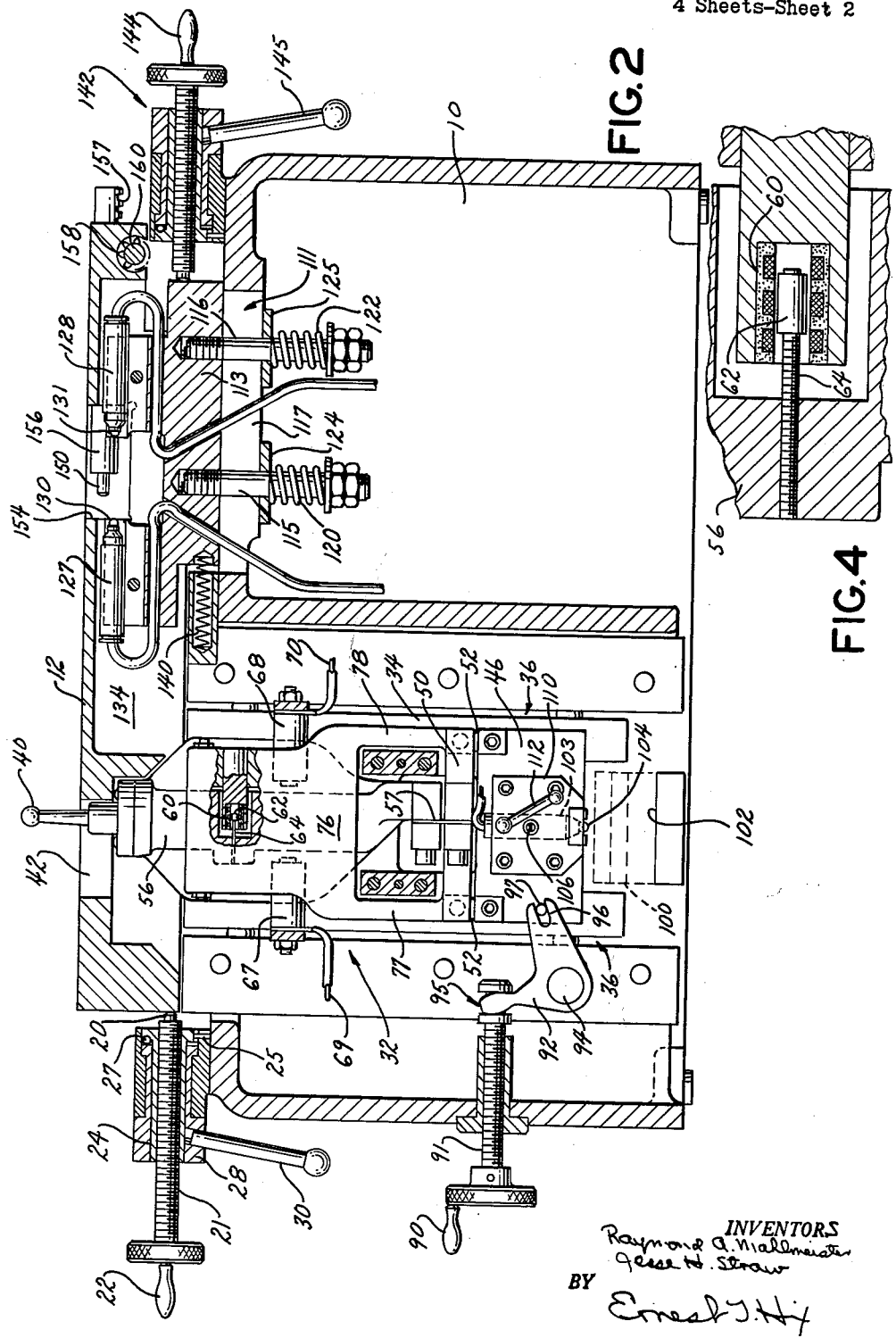
INVENTORS
Raymond A. Mahlmeister
Jesse H. Straw
BY
Ernest J. Hy
ATTORNEY June 25, 1963  R. A. MAHLMEISTER ETAL  3,094,788
GAGING DEVICE Filed June 9, 1958

4 Sheets-Sheet 3

INVENTORS
Raymond A. Mahlmeister
Jesse H. Straw
BY
Ernest J. Hix
ATTORNEY

June 25, 1963  R. A. MAHLMEISTER ETAL  3,094,788
GAGING DEVICE

Filed June 9, 1958  4 Sheets-Sheet 4

INVENTORS
Raymond A. Mahlmeister
Jesse H. Straw
BY
Ernest J. Hix
ATTORNEY

United States Patent Office 3,094,788
Patented June 25, 1963

3,094,788
GAGING DEVICE
Raymond A. Mahlmeister and Jesse H. Straw, Dayton, Ohio, assignors to The Sheffield Corporation, Dayton, Ohio, a corporation of Delaware
Filed June 9, 1958, Ser. No. 740,970
3 Claims. (Cl. 33—174)

This invention relates to gaging devices and more particularly to gaging devices of high precision for measuring work dimensions.

It is an object of this invention to provide an improved gaging device for measuring work dimensions having features providing for extreme accuracy while giving rapid gaging and more universal application in a rugged construction.

It is a further object to provide a gaging device having a first gaging means responsive to the disposition of a work surface relative to a reference, second gaging means being provided for determining relative movement between a workpiece and the reference as the first gaging means is alternately placed in gaging association with surfaces at the extremities of a work dimension, whereby through alternative application of the first gaging means to the work surfaces the dimension to be gaged is precisely measured.

It is a further object to provide a gaging device including only a single gaging contactor alternatively applied to the surfaces at the extremities of a dimension to be gaged, whereby gaging of very small work dimensions and holes is made possible and deformation of gaging components is reduced or eliminated, thus providing broader ranges of application and higher accuracies in gaging then possible with prior known devices of this general character.

It is a further object to provide such a gaging device wherein a single gaging contactor is selectively urged for alternative engagement of its opposite sides with the extreme surfaces of a work dimension such as a diameter to be gaged, gaging means being provided for precisely determining a nominal movement of the workpiece relative to a support for the gage contactor to engage and locate the contactor in the same reference position at the extremities of movement with a nominal dimension, whereby deviations in the contactor position indicate deviations of the actual dimension from nominal.

It is a further object to provide a gaging device for measuring holes and other work dimensions through direct reference comparison with precision gage blocks, thus eliminating intermediate error creating members such as parallels and the like, whereby the highest accuracy is achieved.

It is a further object to provide such a gaging device having adjustments for precision checking of tapered holes and the perpendicularity of hole to face in master rings and the like.

Figure 6:
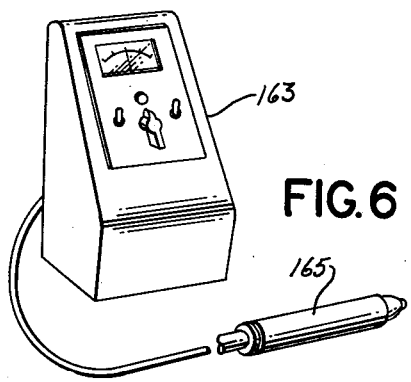
Figure 7:
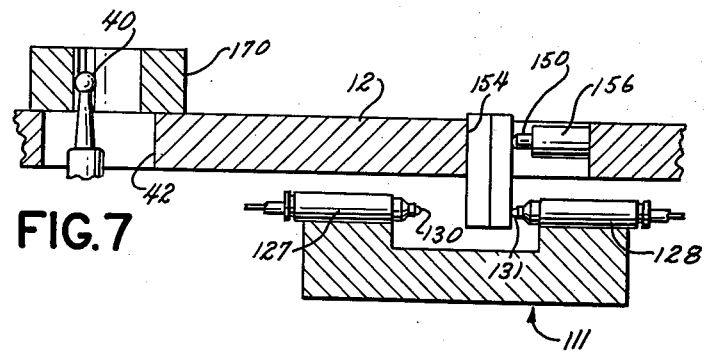
Figure 8:
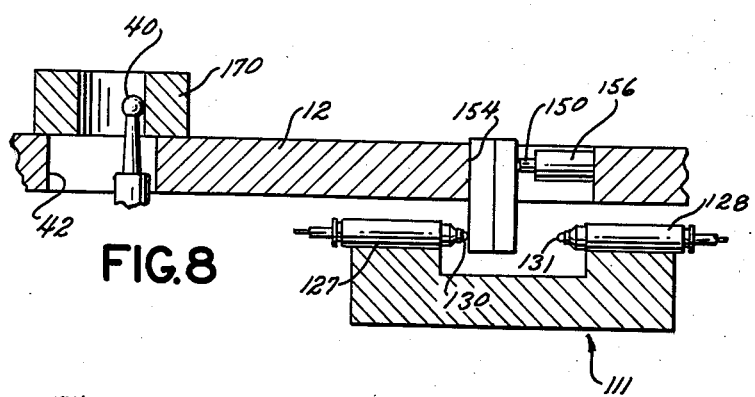
Figure 9:
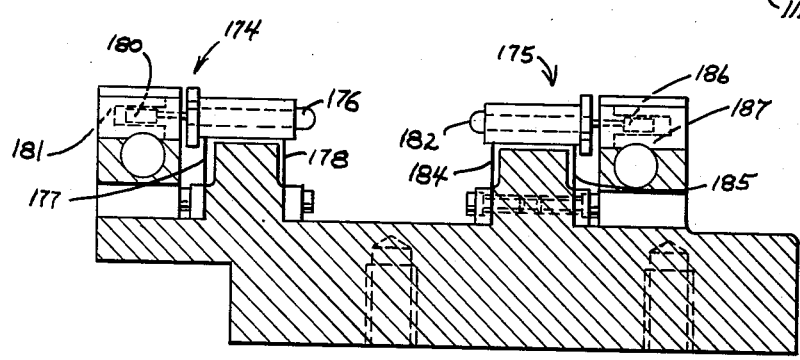

Other objects and advantages of this invention will be apparent from the following description, the appended claims and the accompanying drawings in which:

FIGURE 1 is a plan view of a precision gaging instrument embodying the present invention, FIGURE 2 is a sectional view taken on line 2—2 of FIGURE 1, FIGURE 3 is a sectional view on line 3—3 of FIGURE 1, illustrating a portion of the clamping structure for retaining a gage block stack, FIGURE 4 is an enlargement of a fragment of FIGURE 2, FIGURE 5 is a transverse sectional view through the gage assembly of the instrument, taken on line 5—5 of FIGURE 1, FIGURE 6 illustrates an exemplary gage head and gage indicator, FIGURES 7 and 8 are diagrammatic illustrations showing the instrument in two positions involved in a gaging operation, and FIGURE 9 is a sectional view of a modified gaging caliper arrangement.

The present invention has been illustrated as embodied in an instrument of the laboratory type for very high precision gaging of work dimensions. The illustrated instrument has particular application to measuring diameters of holes and will be so described.

A first gaging means responsive to the disposition of a work surface is placed alternatively into gaging association with surfaces at the extremities of a work dimension being gaged. Further gaging means are provided to determine the relative movement between the workpiece and first gaging means to bring said first gaging means into alternative association with the extreme surfaces.

As herein shown a movable work supporting table provides the relative movement and a single gaging contactor projecting above the table is positioned by alternative engagement with opposite sides of a work diameter as the table is moved on a base. In the illustrated instrument gaging means directly referencing on gage blocks determine the extremes of a nominal displacement of the table.

In its usual application the table is positioned to obtain a reference indication with the contactor engaging the surface at one extremity of the diameter to be gaged. Then, using the gaging means between the table and base, the table is moved through a displacement calculated to obtain the same reference indication with a nominal part diameter and with the contactor engaging the other side of the hole. Deviations from the reference indication then indicate deviation of the actual work diameter from nominal.

Referring more particularly to the drawings the exemplary instrument indicated includes a massive cast base 10 for rigidity and a work supporting table 12 mounted thereon. Table 12 is supported and guided for movement along the length of base 10 by ball ways indicated at 14 in FIGURE 5. If desired one row of supporting balls can be seated on one side in a V-way while the other sides of the balls engage a horizontally flat way. This construction would accommodate relative expansion between table 12 and base 10 and eliminate errors due to misalignment of the V-ways.

Springs 16 extending between pins 17 fixed to table 12 and pins 18 fixed to base 10 urge table 12 to the left as seen in FIGURES 1 and 5 to a position adjustably determined by stop 20 on screw 21. Crank 22 serves to rotate screw 21 within nut 24 to adjustably position stop 20 and table 12 relative to base 10. This provides a rapid table adjustment. Nut 24 has a flange at its right-hand end which is grooved to receive a pin 25 restraining nut 24 against rotation. A follower 27 on nut 24 engages the skewed right-hand end of a member 28 rotatable by lever 30. Thus upon rotation of lever 30 nut 24 is cammed minutely in one direction or the other, ultimately positioning stop 20 for a fine adjustment of table 12.

FIGURES 2 and 5 particularly illustrate the gaging assembly 32 at the left-hand end of base 10. This assembly includes a carrier 34 supported for vertical movement within base 10 by ball ways 36 at each side thereof (see particularly FIGURE 2). A replaceable gaging contactor 40 is mounted on carrier 34 by supporting means extending upward within base 10. Contactors 40 of different diameters are provided for different size parts to be gaged. The support for contactor 40 extends upward through an elongated slot 42 provided in the left-hand work supporting portion of table 12 to dispose contactor 40 for engagement with the work.

The supporting means mounting contactor 40 on carrier 34 includes a compound flexible leaf arrangement. Bracket 46 mounted on carrier 34 supports a cross shaped intermediate member 50 for pivoting movement about an axis parallel to the direction of movement of table 12 through flexible leaves 52. Arm 56 carrying contactor 40 is supported on intermediate member 50 by flexible leaves 57 for swinging movement transverse the direction of table movement. Thus contactor 40 is supported for compound pivoting about axes parallel to and transverse of the line of movement of table 12.

The movement of contactor 40 about leaves 57 is for gaging. This movement is sensed by a differential transformer arrangement cooperating between base 10 and arm 56. This includes a differential transformer 60 and a core or armature 62 supported by rod 64 from arm 56 for movement therewith. See particularly FIGURE 4. Thus gaging movements of contactor 40 position core 62 relative to the windings of transformer 60. The resulting signal is determined by the position of contactor 40 and the work dimension. A suitable indicating circuit for use therewith is illustrated and described in detail in patent application Ser. No. 501,602, filed April 15, 1955. It will be appreciated that other detection means of high precision can be equally well employed.

In view of the fact that only a single contactor 40 is utilized and engages the work at its opposite sides it is necessary to reverse the gaging bias on arm 56 depending upon the direction of effective gaging. This is accomplished in this exemplarly illustration by opposed electromagnets 67 and 68 selectively energized through leads 69 and 70. One or the other of electromagnets 67 and 68 is energized to attract arm 56 and provide the desired bias of the arm about leaves 57 and in the gaging direction. The electromagnets are positioned during assembly to obtain the desired biasing pressures. A similar yieldable biasing can be achieved by using permanent type magnets selectively placed in association with opposite sides of gaging arm 56.

As seen particularly in FIGURE 2 intermediate member 50 supports an upwardly extending projection 76 by means of arms 77 and 78 at each side of the lower end of arm 56. Projection 76, as seen in FIGURE 5, extends along and beside arm 56. Adjustment means are provided to swing projection 76 about leaves 52 to adjust contactor 40 transverse the direction of table movement independently of the gaging movement parallel thereto.

This adjustment includes a lever 73 pivoted at 79 on base 10. The lower end of lever 73 is biased against a stop screw 80 by spring 82. Crank 84 is connected to screw 80. The upper end of lever 73 is urged to the left by spring 87 and engages a pin 88 extending into engagement with projection 76.

Thus as crank 84 is turned the upper portion of gaging assembly 32 is rocked transverse the table about leaves 52. This provides an extremely useful adjustment for seeking a diametral line of gaging in a master ring or the like. With the master ring adjustably clamped on table 12 and in engagement at one side with contactor 40, rotation of crank 84 will tram the contact along the curved surface of the hole to be gaged. The extreme indication will be obtained when contactor 40 is at the lowest point on the curve and is situated for gaging movement about leaves 57 and precisely along the diameter of the work. This makes possible a positioning adjustment for precise diametral measurement without the necessity for re-positioning the work on the table.

Carrier 34 of gaging assembly 32 is vertically adjustable by means of crank 90 which rotates screw 91 to rock bell crank 92 about a pivot 94 provided in base 10. One end of crank 92 is coupled at 95 to screw 91 and its other end has a slotted portion 96 engaging pin 97 fixed to carrier 34. If desired, fine and coarse vertical positioning of carrier 34 can be obtained by using screw and cam adjustment as for the fine and coarse table positioning. The vertical position of carrier 34 can be precisely determined by mounting a selected stack of gage blocks 100 on supporting surface 102 and utilizing these in connection with a gaging cartridge 103 mounted on carrier 34 and having a work contactor 104 for engaging the stack of blocks. The stack of blocks 100 will determine the basic elevation and refinement which can be attained by positioning carrier 34 through crank 90 and observing a suitable indicator connected to and controlled by cartridge 103. The particular cartridge illustrated is of the differential transformer type. A suitable cartridge which can be applied is shown in more detail in Patent 2,833,046 issued May 6, 1958.

Cartridge 103 is clamped in a member 105 by set screw 106. Member 105 is supported by an integrally formed reduced section 108 from a bracket 110 fixed to carrier 34. Movements of lever 112 adjust a screw 114 threaded into bracket 110 and engaging member 105. This provides a fine rocking movement of cartridge 103 for precise positioning during setup.

Thus by utilizing crank 90 and the associated gaging structure contactor 40 can be precisely positioned at a desired height above table 12 for gaging applications as desired. Also the contactor can be trammed vertically along a workpiece to measure perpendicularity of a hole relative to a workpiece face engaging the table and also to check taper error in holes.

As shown in FIGURE 2 a caliper assembly 111 is supported at the right-hand of the instrument for measuring or determining the position of table 12 relative to base 10. This assembly includes a caliper body 113 supported and guided by screws 115 and 116 threaded thereinto and slidable in close fitting relationship in a slot 117 within base 10. Springs 120 and 122 urge washers 124 and 125 against the lower surface of slot 117 to firmly position caliper body 113 for its endwise adjustment. Opposed gage heads 127 and 128 are supported in alignment with the direction of movement of table 12 by body 113. These cartridges can be similar to the type previously referred to. Cartridges 127 and 128 respectively provide movable work contactors 130 and 131 for purposes later described. The upper portion of caliper assembly 111 extends upward within an elongated cutout portion 134 in the lower surface of table 12.

Caliper assembly 111 is urged to the right as seen in FIGURE 2 by a spring 140 and is positioned against this spring by a fine and coarse adjustment assembly 142 similar to that provided for adjusting the position of table 12 and including crank 144 and lever 145.

Clampling means are provided for fixing a selected stack of gage blocks to table 12 and between contactors 130 and 131 of cartridges 127 and 128. This clamping arrangement includes plungers 150 and 151 opposing a clamping surface 154 on table 12. A detailed section of the supporting structure for plungers 150 is shown in FIGURE 3. As seen in that figure plungers 150 and 151 are slidable within rod 156 guided in table 12. Spring 155 resiliently urges plunger 150 to the left as seen in this figure. The lower rearward surface of rod 156 has rack teeth 157 formed thereon which mesh with a pinion 158 on shaft 160 rotatable by knob 161. Plunger 151 and its supporting rod 164 are similarly operated from knob 161. Spring loaded shoes in table 12 engage rods 156 to maintain them in their adjusted positions.

Thus knob 161 can be rotated in one direction to retract rods 157 and 164 as well as plungers 150 and 151. A selected stack of gage blocks is mounted against face 154 with the reference dimension extending in the direction of table movement. Knob 161 is then rotated in the opposite direction to bring plungers 150 and 151 into yieldable clamping engagement with the stack. Calibration marks adjacent the outer ends of plungers 150, 151 reference at the outer ends of rods 157 and 164 to insure that the clamping springs within rods 157 and 164 are compressed consistently for the same clamping pressure each time. This relationship is shown in FIGURES 7 and 8.

FIGURE 6 illustrates diagrammatically an indicating instrument 163 connected to exemplary cartridge 165. A similar indicating instrument 163 can be connected to each of the gaging units involved in the operation of the instrument or a single indicating instrument can be selectively switched to the different sensing means as they are employed.

In FIGURE 9 a caliper arrangement similar to that previously described but with a modified gaging arrangement is illustrated. A pair of gaging assemblies 174 and 175 are used. In assembly 174 a contact 176 supported on parallel flexible leaves 177, 178 positions an armature 180 relative to the windings of a differential transformer unit 181. Contactor 182 in assembly 175 is similarly supported on leaves 184, 185 and positions armature 186 relative to transformer 187. In this manner sliding components are eliminated and the movement is friction free for highest accuracy. Otherwise the application and operation of this modified construction is the same as that of the other figures.

The operation of the instrument will be more readily understood from the illustrations of FIGURES 7 and 8 which show the apparatus in two positions involved in gaging the diameter of a hole in a master ring 170.

As a first step in a gaging operation a gage block set having precise overall dimension of 1 inch, for example, is inserted between and in engagement with contactors 130 and 131 of caliper assembly 111. The positions of cartridges 127 and 128 are adjusted to obtain zero indications on their associated indicators. This insures that between the zero positions of contactors 130 and 131 there is a precise known displacement.

A gage block set having an overall dimension equal to the displacement between the zero positions of contactors 130 and 131 minus the amount by which the nominal part diameter exceeds the diameter of contactor 40 is then clamped to table 12 by placement between plungers 150, 151 and clamping face 154. If, for example, the nominal part diameter were .500 inch and the diameter of contactor 40 was .250 inch a gage block stack of an overall .750 inch dimension would be clamped to the table and between contactors 130 and 131. This results in a total space between the end faces of the gage block stack and the zero positions of contactors 130, 131 of .250 inch in this example, which is the amount by which the nominal diameter exceeds the diameter of contactor 40.

While the following portion of the operation is described with reference to FIGURES 7 and 8 in sequence, measurements can be made in the reverse sequence. If desired a single manually operated switch can be used to connect each respective gaging sensing means to a single instrument 163 while simultaneously energizing the proper one of electromagnets 67, 68.

Initially crank 90 is positioned to properly elevate contactor 40, the part is centered visually transverse table 12 and in engagement with contactor 40, and electromagnet 67 is energized to bias contactor 40 against the left-hand side of the hole to be measured as seen in FIGURE 7. Crank 84 is then rotated to swing contactor 40 transverse of table 12 and locate the line of gaging movement precisely on the diameter of the part as previously described. After this is accomplished crank 22 and lever 30 are employed to move table 12 and obtain a reference indication (usually a "zero" indication) through the cooperation of core 62 with differential transformer 60.

Caliper assembly 111 is then adjusted through crank 144 and lever 145 to engage contact 131 against the gage block set and obtain a zero indication on the indicator connected to cartridge 128. Caliper assembly 111 is not moved during the remainder of the gaging operation.

The displacement between the left-hand of the gage block set as seen in FIGURE 7 and the zero position of contact 130 is equal to the movement of table 12 to the left which should provide the same reference indication with contactor 40 in engagement with the opposite size of a hole of nominal diameter.

As the next step in the gaging operation electromagnet 68 is energized to reverse the bias on arm 66 and table 12 is moved to the left to bring contactor 40 into engagement with the opposite side of the hole wall. The gage block stack is simultaneously positioned against contact 130 of the caliper assembly to obtain a zero indication on the indicator associated with cartridge 127 (see FIGURE 8).

At this point any deviation in the indication obtained with contactor 40 from the indication previously obtained in the disposition of FIGURE 7 will precisely indicate the deviation of the part diameter from nominal. In this example it is the diameter or spacing between surfaces at the extremities of the measured dimension which is being gaged with a contactor 40 of known diameter. Conversely, with a master calibrated ring or parallels between which the spacing is precisely known a work contactor 40 can be gaged and calibrated.

Previous practice in similar gaging operations has involved the use of opposed gaging contacts. In the present apparatus only a single contactor 40 is provided. In the first place this makes possible gaging of extremely small holes because only a single small contact is involved. Also contactor 40 can be made stronger and more rigid for more precise gaging. The instrument of this invention directly references against gage blocks supported by the work carrying table 12 and intermediate parallels or other accessory devices which might produce error are avoided. Through crank 84 contactor 40 can be moved transversely and preliminary adjustments made rapidly and simply in a unique manner. The elevation of contactor 40 through crank 90 makes possible the checking of tapered holes and hole perpendicularity.

Thus it is seen that a gaging instrument of the highest precision has been provided which has unique, easily made adjustments and rugged construction. The ultimate in precision and range of application is insured by referencing directly against gage blocks and through the use of only a single gaging contact alternatively engaging the extremities of the dimension to be measured.

While the form of apparatus herein described constitutes a preferred embodiment of the invention, it is to be understood that the invention is not limited to the precise form illustrated, and that changes may be made therein without departing from the scope of the invention which is defined in the appended claims.

What is claimed is:

1. A gaging device for precision measurement of work dimensions comprising a base, a work supporting table, means supporting said table on said base and guiding it for movement in a given direction, a gaging contactor for positioning engagement of its opposite sides with the surfaces at the extremities of a work dimension to be gaged carried on said base for gaging movement parallel the direction of table movement, sensing means controlled by positions of said contact relative to said base in the gaging direction, a gage caliper having opposed gaging means, means supporting said caliper in said base for adjustment relative thereto parallel to the direction of table movement, said gaging means being supported in facing relationship along the line of adjustment, and means on said table for supporting a gage block of predetermined dimension relative to the nominal work dimension in fixed position thereon for movement between said opposed gage means upon table adjustments during gaging.

2. A gaging device for precision measurement of work dimensions comprising a base, an elongated table supported on said base for endwise movement relative thereto, said table having a work supporting surface having an opening therethrough, a gaging arm projecting upward through said opening, means in said base mounting said arm for friction-free pivoting movement about an axis transverse the direction of table movement, first gaging means cooperating between said base and said arm, a gaging contact having opposing gaging sides carried by said arm above said table for alternative engagement of its opposite sides with oppositely facing surfaces at the extremities of a work dimension to be gaged, means in said base for selectively biasing said gaging arm in opposite directions about its pivot axis, clamp means on said table for carrying gage blocks of predetermined overall dimension relative to the nominal work dimension in the direction of table movement, spaced gage means in said base for respective association with opposite ends of said gage blocks upon table movement, and adjustable means for moving said table and a workpiece carried thereby for alternative engagement of said contact with opposite extremities of a work dimension while simultaneously placing said gage blocks in alternative association with said gage means.

3. A gaging device for precision measurement of work dimensions comprising a base, a work supporting table carried on said base for movement in a given direction, a work engaging contactor, a carrier mounted in said base for vertical movement, means supporting said contactor from said carrier for gaging movement in a direction parallel the direction of table movement and for adjustable movement in a direction transverse thereto, said supporting means including friction-free flexible leaf supports disposed at right angles to one another, adjustable means cooperating with said supporting means for positioning said work contactor about one of said leaf supports and transverse the gaging direction, gage means controlled by movement of said contactor in the other of said directions, a gaging caliper having opposed gage heads, means adjustably mounting said caliper in said base in line with the direction of table movement, and clamp means on said table for fixedly supporting gage blocks having an overall dimension of predetermined relation to the nominal work dimension thereon projecting between said gage means for alternative association therewith.

References Cited in the file of this patent
UNITED STATES PATENTS

| | | |
|---|---|---|
| 2,016,978 | Thomas | Oct. 8, 1935 |
| 2,361,788 | Neff | Oct. 31, 1944 |
| 2,452,862 | Neff | Nov. 2, 1948 |
| 2,456,383 | Collins | Dec. 14, 1948 |
| 2,504,961 | Braaten | Apr. 25, 1950 |
| 2,518,524 | Cook | Aug. 15, 1950 |
| 2,697,879 | Tandler | Dec. 28, 1954 |
| 2,697,880 | Tandler | Dec. 28, 1954 |
| 2,753,634 | Tanplin | July 10, 1956 |
| 2,835,042 | Tandler | May 20, 1958 |
| 2,860,419 | Muller | Nov. 18, 1958 |